(12) United States Patent
Brown et al.

(10) Patent No.: US 11,741,735 B2
(45) Date of Patent: *Aug. 29, 2023

(54) AUTOMATICALLY ATTACHING OPTICAL CHARACTER RECOGNITION DATA TO IMAGES

(71) Applicant: LendingClub Bank, National Association, Lehi, UT (US)

(72) Inventors: Aaron Brown, San Francisco, CA (US); Samantha Puth, San Francisco, CA (US)

(73) Assignee: LendingClub Bank, National Association, Lehi, UT (US)

( * ) Notice: Subject to any disclaimer, the term of this patent is extended or adjusted under 35 U.S.C. 154(b) by 75 days.

This patent is subject to a terminal disclaimer.

(21) Appl. No.: 17/317,094

(22) Filed: May 11, 2021

(65) Prior Publication Data

US 2021/0264556 A1     Aug. 26, 2021

Related U.S. Application Data

(63) Continuation of application No. 15/832,499, filed on Dec. 5, 2017, now Pat. No. 11,080,808.

(51) Int. Cl.
  *G06K 9/00*    (2022.01)
  *G06V 30/416*  (2022.01)
  *G06T 1/00*    (2006.01)
  *G06V 30/10*   (2022.01)

(52) U.S. Cl.
  CPC .......... *G06V 30/416* (2022.01); *G06T 1/0021* (2013.01); *G06T 2201/0062* (2013.01); *G06T 2201/0065* (2013.01); *G06V 30/10* (2022.01); *G06V 2201/10* (2022.01)

(58) Field of Classification Search
  CPC .......... G06T 1/0021; G06T 2201/0062; G06T 2201/0065
  See application file for complete search history.

(56) References Cited

U.S. PATENT DOCUMENTS

| | | | |
|---|---|---|---|
| 9,558,234 B1 | 1/2017 | Lifantsev | |
| 10,977,214 B2 * | 4/2021 | Eapen | G06Q 20/042 |
| 11,080,808 B2 * | 8/2021 | Brown | G06T 1/0021 |
| 11,295,072 B2 * | 4/2022 | Sundar | G06F 40/174 |
| 2006/0036934 A1 | 2/2006 | Fujiwara | |

(Continued)

OTHER PUBLICATIONS

Brown, U.S. Appl. No. 15/832,499, filed Dec. 5, 2017, Office Action.

(Continued)

*Primary Examiner* — Tom Y Lu
(74) *Attorney, Agent, or Firm* — Hickman Becker Bingham Ledesma LLP

(57) ABSTRACT

Techniques for automatically attaching optical character recognition data to images are provided. The techniques include receiving an image file containing an image and performing optical character recognition on the image to generate text output. The techniques then continue by identifying a particular text item from within the generated text output and determining that the particular text item is a value for particular corresponding key. Then metadata that indicates that the particular text item is a value for the particular key is stored in the image file.

20 Claims, 4 Drawing Sheets

(56) References Cited

U.S. PATENT DOCUMENTS

2007/0168382 A1 7/2007 Tillberg
2011/0052062 A1 3/2011 Chiu

OTHER PUBLICATIONS

Brown, U.S. Appl. No. 15/832,499, filed Dec. 5, 2017, Notice of Allowance.
Brown, U.S. Appl. No. 15/832,499, filed Dec. 5, 2017, Final Office Action.

* cited by examiner

FIG. 2A

200 — REGISTRATION CARD 230

| | 240 | 250 | 260 |
|---|---|---|---|
| | Registration Valid From | TYPE | License Number |
| AUTO | 11/01/2017 to 11/01/2018 | 11 | 6ABC123 |
| | 241 | 251 | 261 |

210 → VIN
211 → 1AB1A12A1AB123456

Make
VOLK

Body type
4D

Sam Smith
123 Long Road
City, State Zip

Class  YEAR
CY  2017

Date issued
10/10/2017

Total Fees Paid:
$123.00

200 — REGISTRATION CARD

| | Registration Valid From | TYPE | License Number |
|---|---|---|---|
| AUTO | 11/01/2017 to 11/01/2018 | 11 | 6ABC123 |

210 → VIN
211 → AB1A12A1AB123456

Make
VOLK

Body type
4D

Sam Smith
123 Long Road
City, State Zip

Class  YEAR
CY  2017

Date issued
10/10/2017

Total Fees Paid:
$123.00

200 — REGISTRATION CARD

| | Registration Valid From | TYPE | License Number |
|---|---|---|---|
| AUTO | 11/01/2017 to 11/01/2018 | 11 | 6ABC123 |

210 → VIN
212 → (4AB1A12A1AB123456)

Make
VOLK

Body type
4D

Sam Smith
123 Long Road
City, State Zip

Class  YEAR
CY  2017

Date issued
10/10/2017

Total Fees Paid:
$123.00

AUTOMATICALLY ATTACHING OPTICAL CHARACTER RECOGNITION DATA TO IMAGES

BENEFIT CLAIM

This application claims the benefit as a Continuation of application Ser. No. 15/832,499, filed Dec. 5, 2017, the entire contents of which is hereby incorporated by reference as if fully set forth herein, under 35 U.S.C. § 120. The applicant(s) hereby rescind any disclaimer of claim scope in the parent application or the prosecution history thereof and advise the USPTO that the claims in this application may be broader than any claim in the parent application.

FIELD OF THE INVENTION

The present invention relates to storing information related to images within image files, and more particularly to automatically attaching optical character recognition data to images.

BACKGROUND

As the world becomes increasingly digital, the importance of images grows. Images can be used for numerous business and technical needs. For example, images may be used to communicate details necessary for a business transaction. For example, the image of a user's car registration may include much of the information needed to fill out a loan application to refinance the car. Generally, when used as part of a business process, images (e.g. car registrations) are viewed by humans, who then input data from the images into an interface (e.g. for loan applications), where it is then stored in a separate computer file or database. This human operator's interpretation of the images can be problematic when the image is misinterpreted or errors are made in transcribing the data in the image into the interface. Further, it is difficult to later check the data in the images against the information input by the human operator. Part of the issue with checking the data is that the data is stored separate from the image.

Further, the fact that the data from the image is stored separately from the image can make later retrieval of the data more difficult (e.g., more than one query or database "join" may be needed, information may need to be pulled from multiple systems, etc.). This difficulty can cause images dealing with the processing of data from the images more difficult and complex to program, debug, and maintain.

The techniques herein address these issues.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

FIGS. 2A-2C depict images containing text.

DETAILED DESCRIPTION

Figure 1:
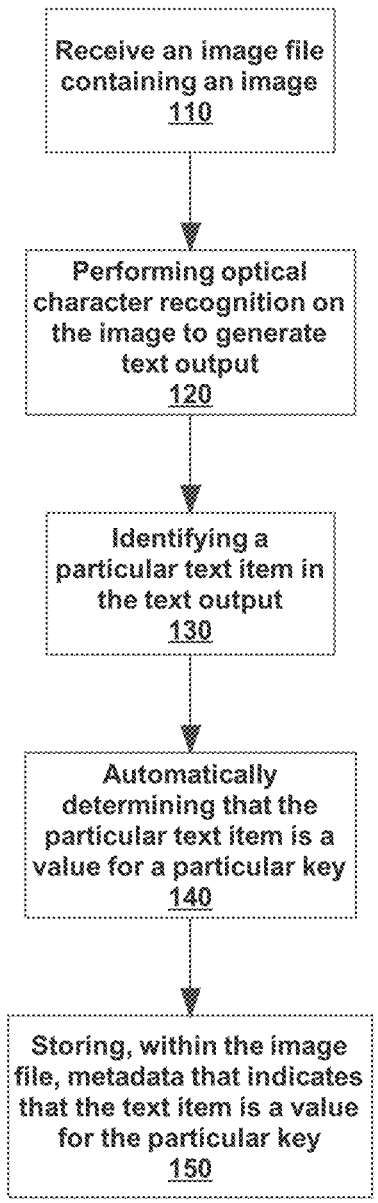
FIG. 1 depicts a process for automatically attaching optical character recognition data to images.

In the following description, for the purposes of explanation, numerous specific details are set forth in order to provide a thorough understanding of the present invention. It will be apparent, however, that the present invention may be practiced without these specific details. In other instances, well-known structures and devices are depicted in block diagram form in order to avoid unnecessarily obscuring the present invention.

General Overview

As the ubiquity of high quality mobile cameras (such as those on smart phones) increases, the ability for businesses to use images as part of their business process also increases. In some instances, images can serve as input to a business process, where human input would have traditionally been needed. Consider, for example, a process that requires information from a vehicle registration (e.g., a loan for an automobile refinance). There is a considerable amount of information is contained on the document, and transcription of the information by the average person may be quite error prone.

Further, even if the information from an image (e.g., a vehicle registration) is transcribed properly, then the data from the image will be stored separately from the image. Keeping track of the relationship between an image and information associated with the image is difficult. Typically, a database entry will include the data from the image, and, at best, a reference to the underlying image. Using the information in combination can therefore be difficult. Therefore, if one wanted to later determine whether information from the image was entered correctly, it would require access to both the original image and the repository in which the associated data was stored.

Techniques herein address these issues.

The techniques herein perform optical character recognition on the incoming images in order to generate text. That recognized text is analyzed in order to determine whether any of the items in the recognized text are values for a key-value pair, where the business context may be the source of known keys for which values are needed. The information indicating that the text is the value for a particular key is stored within the image as metadata. By automatically recognizing that the recognized text is associated with a particular key, and storing such information in the metadata of the file, the techniques overcome the issue of text information being stored separately from the image discussed above. As such, the techniques make it easy to maintain the association between the image and the text from the image, error checking on the data extracted from the image, and the like.

Referring again to the example above in more detail, in some embodiments, a user can submit an image file of a document (e.g., a vehicle registration), and image analysis process can perform optical character recognition (OCR) on the image file. Text can be extracted from the image file. The image analysis process (or, for example, another process such as a business process), can then determine that one or more elements of the text are values for a particular key relevant to the business process. For example, for a vehicle registration, the keys such as vehicle identification number (VIN), license plate number, and registration expiration may all have corresponding values present and detected in the image file using OCR. Metadata can then be stored as metadata in the image file, the metadata indicating that each of the detected values correspond to particular keys.

Various embodiments include the ability to superimpose on the image a rendering of the OCR-ed text over the original text from the image file. This may help illustrate where text came from and whether it was detected correctly, and, if editable, allow a user to correct the recognized text.

Figure 3:
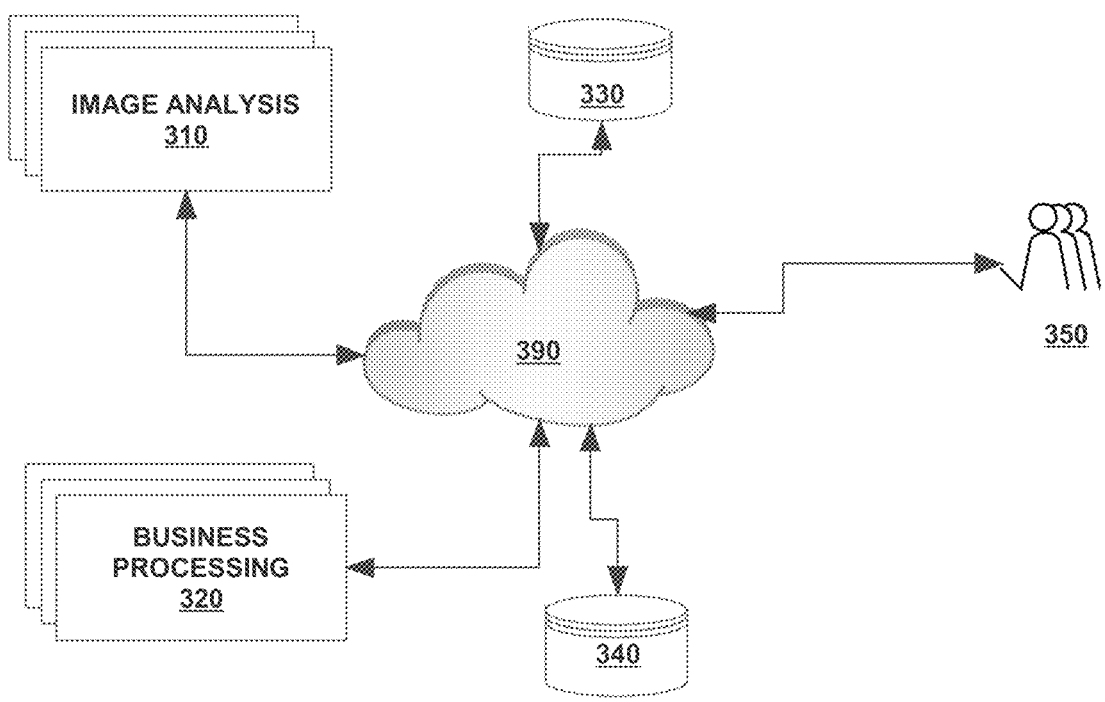
FIG. 3 is a block diagram that depicts an example system for automatically attaching optical character recognition data to images.

Turning to FIG. 3, in some embodiments, a user 350, as part of a business process being executed by business process system 320, may upload an image to an image analysis system 310 via a network 390, and the image analysis system 310 may receive 110 the image sent from the user 350 and extract text (and optionally location information for the extracted text) from the image and send it back to business process system 320. Business process system 320 may use the information from the image analysis system 310 to determine key:value information and store indications of the key:value date in the metadata of the image file. In some embodiments, the user 350 is presented with the recognized text. The user may (or may not) correct the recognized text and then the text may be stored (possibly with revision history) at an attached storage 330 or 340 (or storage at image analysis system 310 or business process system 320). The information from the image in the form of values for particular keys may then be used to fill out a form that is part of the business process. For example, if the business process is applying for a loan, and the document being recognized is a driver's license, then the form being filled in (e.g., a loan application) may be prefilled with the information recognized from the driver's license (e.g., driver's license number, name, address, etc.).

Example Process for Automatically Attaching Optical Character Recognition Data to Images FIG. 1 depicts a process 100 for automatically attaching optical character recognition data to images. Process 100 proceeds by receiving 110 an image file containing an image. The image can be received in any appropriate manner. For example, as part of a business process, a user or customer may upload an image in response to a prompt. The prompt may be given as part of a webpage displayed on a browser to the user, and the user may select a file (e.g., from local or remote storage) to upload. In some embodiments, an application may be running on a smartphone or other device being operated by the user. The application may prompt the user to upload a file, and the user may access and upload a file from storage on that device. In some embodiments, the user may be prompted to take a photograph of a document, and that photograph may serve as the image file that the user uploads, and that is received 110. In some embodiments, an application may use an API for a server in order to transmit the file. The server can then receive 110 the file from the user's application via the API.

The received 110 image may be of any appropriate format. For example, the image file may contain images in any appropriate format, and the format may be lossy or lossless. Example formats include JPEG or JPG (Joint Photographic Experts Group, TIFF (Tagged Image File Format), GIF (Graphics Interchange Format), BMP (Windows Bitmap), PNG (Portable Network Graphics), BPG (Better Portable Graphics), and the like. The image files may have images that contain text. Consider, for example, FIG. 2A, which depicts an image of a car registration. In addition to much other text related to a vehicle registration, it depicts a vehicle identification number key text 210 and a vehicle identification number value text 211.

After receiving 110 the image file, the process performs 120 optical character recognition on the image to generate text output. In some embodiments, the optical character recognition technique used can perform one or more pre-processing techniques, such as deskewing, despeckling, binarization, line removal, layout analysis, line and/or word detection, layout analysis, script recognition, character isolation, normalization, and the like. Preprocessing the image may allow for faster and more accurate optical character recognition. The optical character recognition may use matrix matching and/or feature extraction in order to create a list of candidate characters for each character in the text being recognized. In some embodiments, a second pass is used on the image for adaptive recognition. It may use the letter shapes recognized with high confidence on the first pass to improve recognition of the remaining letters on the second pass. In some embodiments, post processing is used to restrict possible outcomes to particular lexicons. For example, it may be known which keys 240-260 are expected in an image of a registration card. Therefore, post processing may look for those words among the sets of candidate characters. Some embodiments also use application-specific optical character recognition techniques in order to improve results. For example, in some embodiments, when the type of image is known, and format for keys and values are known, possible outcomes may be constrained by those application-specific characteristics. For example, if the business process dictates that a particular image should contain an image of a credit card, then the embodiment may limit the first number in the credit card to those known for credit cards (e.g., "4" for Visa, "5" for MasterCard, etc.).

The text output can contain some or all of the text from the image. For example, all of the text from the image may be detected and recognized. In some embodiments, based on the business process, only a portion of the text on the image may be detected. Consider again FIG. 2A, based on the business process, it may be known that the image is a car registration form a particular state. It may therefore be the case that the text from the top-left of the image reading "Registration Card" 230 may not be recognized as part of the performance 120 of OCR. In some embodiments, the key text or titles of the data may not be recognized (e.g., "registration valid from" 240, "Type" 250, "License Number" 260). The value text 241-261 (depicted in FIG. 2A) may be recognized and associated with the keys 240-260 based on location of the value text 241-261. Further, in some embodiments, it may be known that particular text are in particular locations and finding values in those locations indicates that the particular text is a value for a particular key. For example, driver's licenses for each US state have identifying information in particular locations, vehicle registrations follow format rules (often different among states), credit cards follow a few set patterns in terms of layout. If the type of document is known or determined (not depicted in FIG. 2), then the format of the document may be known and be used to detect 130 the type of text and the text itself. For example, it may be known that the image 200 depicts a vehicle registration and that the license plate number will always occur in a particular location on car registrations. Finding particular text 261 in the location where license plate values occur indicates that that particular text 261 is associated with the "license plate number" key.

In embodiments where the type of document depicted in the image is not known, the location of a particular label may be determined as well as the location of particular text. The particular label may be associated with a key (e.g., "license plate number") and the location of the particular text relative to the particular label (e.g., with the particular text being near and below the particular label) may indicate the relationship between the particular text (e.g., license plate number text 261) and the particular key.

In some embodiments, there may be information that is not needed from a particular image based on business process. Therefore, there may be no OCR performed 120 for certain keys and values, such as Type 250 and its associated value 251. In some embodiments, not recognizing all of the text in images may save time and processing resources.

The text generated by the performance 120 of the optical character recognition can be of any appropriate format. The text generated may include the recognized text, which may be all of the text in the image, or a subset of it, as discussed elsewhere herein. Further, the generated text may be included in any appropriate type of file, such as a .TXT text file, an RTF (real text file), a LaTeX document, or the like. In some embodiments, information in addition to the text information may be generated and included. For example, in addition to the text generated by the performance 120 of the optical character recognition, the locations of the words or characters may also be included. For example, the location of the keys 240-260 and/or the value text 241-261 may be included. The location of the words or characters can be in pixel space (e.g., with 0,0 being the upper left pixel), in a percentile location with respect to the image (e.g., 0-100% in each axial direction), in physical measurement space (e.g., 0" through height in one direction and 0" through width in the other), or in any other appropriate and recognizable location format.

The process then detects 130 a particular text item in the text output. Detecting 130 a particular text item in the text output may include analyzing the text in the image. For example, if the text is of a particular known format, then it may be interpreted based on the known format. For example, dates are often in one of a set number of formats such as DD/MM/YYYY, MM/DD/YYYY, or YYYY-MM-DD. Another example is that driver's license numbers are of particular formats unique to states, social security numbers follow a certain pattern, vehicle identification numbers follow a particular textual pattern, etc. If the particular text is of a known format, it may be interpreted as text of that type.

The process will then automatically determine 140 that the particular text item is a value for a particular key. In some embodiments, the key for the particular text item is determined based on format of the data. For example, as noted above, certain types of data may be in expected formats. Dates, locations, vehicle identification numbers, driver's license numbers, social security numbers, etc. may all be of particular formats and when the particular text is in one of those formats, the process knows that the particular text is associated with a key of a type associated with that format. For example, turning to FIG. 2A, value text 241 may have been detected 130 and their format may have been recognized as typical date formats. Based on the business process knowledge that the image 200 is vehicle registration, it may be known that the value text 241 are dates that correspond to the range of time the registration is valid. Note that in some embodiments this determination can be made even if the text associated with the key 240 is not recognized. In order to resolve any ambiguity as to which date is which (beginning date and ending date), the process 100 may look at the location (e.g., it may be that the earlier date is always on the left) and/or the dates themselves (e.g., the beginning date is earlier in time than the ending date). As another example, if it is known that for the particular state, license plate number is in the format of a number, followed by three letters, followed by three numbers, then the format of value text 261 may be recognized as matching that license plate format and therefore be associated with a license plate number key.

In some embodiments, determining 140 that the particular text item is a value for a particular key may include determining 140 which particular key based on location of the particular text. For example, if it is known based on the business process (e.g., knowing that a vehicle registration from a particular state is being uploaded) that the vehicle identification number is in a particular location in the image, then text 211 from within a threshold distance of that location may be assumed to be the vehicle identification number.

In some embodiments, determining 140 that the particular text item is a value for a particular key may include recognizing a key in the image. For example, in addition to recognizing text 211 from FIG. 2A, text 210 may also be recognized. The string in text 210 reads "VIN" and serves as an indicator of the key to be associated with the value of the recognized text 211.

Any of the above techniques for determining 140 that the particular text item is a value for a particular key can be combined together. For example, the format of a vehicle identification number (e.g., 17 characters) and location on an image 200, may be used together to determine that particular text 211 is a value for the vehicle identification number key.

Metadata that indicates that the particular text item is a value for the particular key is then stored 150 in the image file. In some embodiments, the image is stored (or remains) in the image file in the same format as it was originally received. It may also be converted to a different format and stored in the image file. Additionally, metadata associated with the key-value pair is stored in the image file. The value may be stored in any appropriate format, including plain text, binary format, or the like. In some embodiments, the key may also be stored in the same (or different format) than the value. For example, the key and value may both be stored as plain text and separated by punctuation, such as a space or colon, in the form of "key:value" or "value:key". In some embodiments, the key for a value can be implied by the format used. For example, if it is known that an images is a vehicle registration and three key-value pairs are to be stored, then the format for storing that metadata may be {<VIN value>, <full name value>, <license plate number value>, etc.}. In such an embodiment, the location of the values in a list or other structure can define the what the key associated with the value would be. Turning to FIG. 2A and the format above, the list may appear as {1AB1A12A1AB123456, Sam Smith, 6ABC123}, indicating the VIN, full name, and license plate number, respectively, without the explicit use of keys.

In some embodiments, metadata in addition to that indicating the value associated with a key may be stored. For example, the system may have data related to a user stored in a database (or elsewhere), and a pointer to that data may be stored within the metadata. The reference could be a hash or a unique identifier. The data referring to the user may be a row in a database of user information and the information stored in the metadata may be a unique identifier associated with that user.

In some embodiments, the metadata may be stored as JavaScript Object Notation (JSON) in Extensible Metadata Platform (XMP) format. In some embodiments, if the image file already has metadata in it, such as a UserComment, that can be included in the metadata as written to the image file.

An example of the format in which the metadata for key-value pairs might be stored is as follows with the keys explicitly identified:

```
<root>
    <OCRText>
        <vin>1AB1A12A1AB123456</vin>
        <fullName>Sam Smith</fullName>
        <licensePlate>6ABC123</licensePlate>
        . . . etc
    </OCRText>
</root>
```

As another example, in an embodiment where the key is implied by the location of the value within the list might appear as follows as JSON:

```
<OCRText>
    <imageOCRMetadata>1AB1A12A1AB123456</imageOCRMetadata>
    <imageOCRMetadata>Sam Smith</imageOCRMetadata>
    <imageOCRMetadata>6ABC123</imageOCRMetadata>
    . . . etc
</OCRText>
``` where the imageMetadata tag indicates that the following will be the image metadata and the order of the values listed defines the associated key: [<VIN value>, <full name value>, <license plate number value>].

Embodiments saving of the metadata as JSON or other format may allow for simpler searching than if the data were stored elsewhere (e.g., in a database that would then need to be queried). Further, the image file itself contains the metadata. So, providing access to the image file usefully provides access to the image as well as the associated metadata. In some embodiments, the image file can be saved using exiv2, a C++ library, or any other appropriate software, including custom written software.

The process 100 may be repeated multiple times for multiple images and/or may detect and store metadata for more than one key-value pair.

Examples of User Interfaces and Editing Recognized Text

FIG. 2C depicts a user interface displaying recognized text rendered in place of original text on an image. In some embodiments, the text recognized from the image file may be presented to the user, with information extracted from the image file being presented in place of the original text from the related portion of the image. In some embodiments, the presented text may be editable so that the recognized data may be corrected and stored in the metadata of the image.

Consider, for example, a user 350 of FIG. 3, who submits an image file containing image 200 of FIG. 2B. It may be that the text 211 for the vehicle identification number is hard to interpret for the image analysis system 310 because it is blurry or otherwise partially obscured or unreadable. Although not depicted in FIG. 1, process 100 (or another process) may include displaying or rendering the recognized text "over" the text 211. In some embodiments, displaying recognized text 212 (in FIG. 2C) over text 211 (from FIG. 2B) may include making the underlying, original text unviewable temporarily (e.g., by rendering a filled-in white bounding box over the original text 211 in the image) in order to obscure text 211. As another example, the background of rendered recognized text 212 may be opaque, and therefore obscure text 211.

In some embodiments, a user can interact with a user interface by a Toggle Recognized Text button in order to "toggle" the rendered recognized text 212 on and off, thereby allowing a user to see the original text 211 and then the rendered recognized text 212 in sequence. In some embodiments, the font type and size from the recognized text may be detected and the rendered recognized text 212 may be rendered in the same font type and size, which may allow better visual matching between the original text 211 and the rendered recognized text 212. Allowing text to be toggled may be useful when the user would like to double check that the recognized text 212 correctly represents the original text 211. In some embodiments, a user or other operator can make corrections to the recognized text via a user interface (e.g., in an editable field, prefilled with text 212), and that corrected value is stored in the metadata. Further, in some embodiments, uncorrected text and corrected text can each be stored in metadata. For example, if a license plate number was originally recognized as 6A8C123 and later corrected by a user to 6ABC123, then both 6A8C123 and 6ABC123 may be stored in the metadata of the image file. In some embodiments, the uncorrected version may be stored indicating a relationship with a key indicating that it was a previous version, and the corrected version may be stored indicating a relationship with a key indicating that it is the correct or corrected version.

According to an embodiment, a user interface shows recognized text in a form. For example, the recognized text 241-261 from the image may be used to pre-fill editable text boxes on the user interface. Text labels for keys 240-260 may be presented next to the form fields pre-filled with the recognized text 241-261. The user may then correct the information in the user interface in the editable fields of the form, and that corrected information may be stored back into the image as discussed elsewhere herein.

System Overview

FIG. 3 depicts an example system for automatically attaching optical character recognition data to images. System 300 includes elements connected by a communicative coupling or network 390. Examples of communicative coupling and networks are described elsewhere herein. In some embodiments, the process 100 of FIG. 1 may run on the system 300 of FIG. 3 and/or the hardware 400 of FIG. 4. For example, the described functions of process 100 may be performed by image analysis system 310 (and/or business process system 320). The selected, image files and/or metadata might be stored at image analysis system 310, business process system 320, and/or communicatively coupled storage 330 or 340. A business process system 320 may interact with image analysis system 310, or business process system 320 and image analysis system 310 may be the same system and/or run on the same server or set of processors (not depicted in FIG. 3). In some embodiments, either business process system 320 or image analysis system 310 may perform process 100, or process 100 may be executing in part on each. For example, business process system may handle the bulk of process 100, and business process system 320 may use image analysis system 310 for analysis of images to find text in images.

Each of image analysis system 310 and business process system 320 may run on a single computing device, multiple computing devices, in a distributed manner across a network, on one or more virtual machines, which themselves run on one or more computing devices. In some embodiments, image analysis system 310 and business process system 320 are distinct sets of processes running on distinct sets of computing devices. In other embodiments, image analysis system 310 and business process system 320 are intertwined or share processes or functions and/or run on the same computing devices. In some embodiments, storage 330 and 340 are communicatively coupled to image analysis system 310 and business process system 320 via a network 390 or other connection. Storage 330 and 340 may also be part of or integrated with image analysis system 310 and/or business process system 320 via a network 390 or other connection.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
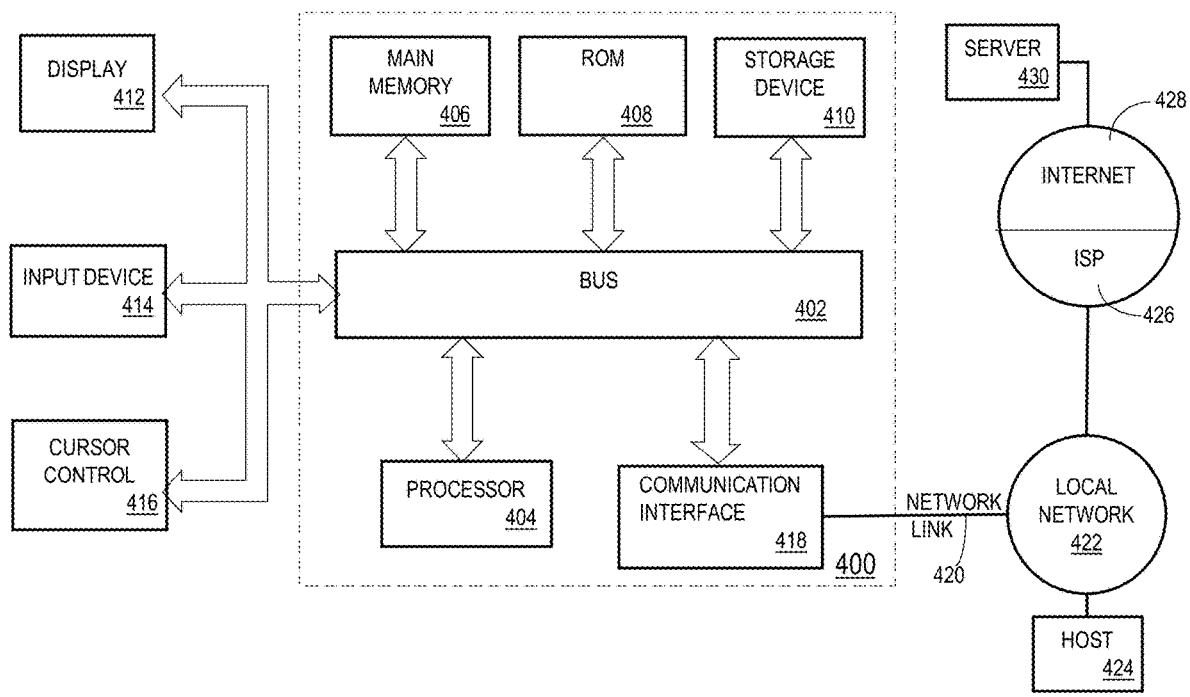
FIG. 4 is a block diagram that illustrates a computer system for automatically attaching optical character recognition data to images.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
receiving an image file containing an image;
performing optical character recognition on the image to extract text output from the image;
within the text output, identifying a particular text item;
wherein the particular text item is located at a particular location of the image;
based at least in part on the image, automatically determining that the particular text item is a value for a particular key;
generating metadata (a) that includes the particular text item and (b) that indicates that the particular text item is a value for the particular key; and
creating an updated image file by inserting, within the image file, the metadata; and
based, at least in part, on the particular location, displaying the particular text item as rendered text within a display of the image;
wherein the method is performed using one or more computing devices.

2. The method of claim 1, wherein the rendered text is displayed in a user interface, the method further comprising:
receiving, via the user interface, an edited version of the particular text item; and
storing, in the metadata, the edited version of the particular text item.

3. The method of claim 2, wherein the edited version of the particular text item is stored, in the metadata, as a corrected version of the value for the particular key; and wherein the particular text item is stored, in the metadata, as a previous version of the value for the particular key.

4. The method of claim 1, wherein the rendered text is displayed at the particular location, within the image, that corresponds to the particular text item.

5. The method of claim 1, further comprising:
receiving an interaction event from a user interface; and
in response to receiving the interaction event, ceasing to display the rendered text within the display of the image while displaying the image.

6. The method of claim 5, further comprising:
receiving a second interaction event from the user interface; and
in response to receiving the second interaction event, displaying the rendered text within the display of the image.

7. The method of claim 1, wherein a representation of the particular text item at the particular location of the image is obscured.

8. The method of claim 7, further comprising:
receiving an interaction event from a user interface; and
in response to receiving the interaction event from the user interface, ceasing to obscure the representation of the particular text item at the particular location of the image.

9. The method of claim 1, further comprising:
detecting a font type and/or a size of a representation of the particular text item in the image;
wherein the rendered text matches the font type and or size.

10. The method of claim 1, further comprising:
displaying, in a user interface, a form that includes a particular editable text box that is visually associated with a label for the particular key; and
populating the particular editable text box with the particular text item.

11. The method of claim 10, further comprising:
receiving, via the particular editable text box in the user interface, a corrected text item associated with the particular key;
generating second metadata (a) that includes the corrected text item and (b) that indicates that the corrected text item is a value for the particular key; and
inserting, within the image file, the second metadata.

12. The method of claim 10, further comprising:
within the text output, identifying a second text item;
based at least in part on the image, automatically determining that the second text item is a value for a second key;
wherein the form includes a second editable text box that is visually associated with a label for the second key; and
populating the second editable text box with the second text item.

13. The method of claim 1, wherein automatically determining that the particular text item is a value for the particular key is based, at least in part, on the particular location of the particular text item.

14. The method of claim 13, wherein automatically determining that the particular text item is a value for the particular key is further based, at least in part, on the image being of a particular document type.

15. The method of claim 1, further comprising:
within the text output, identifying a particular label that corresponds to the particular key;
wherein the metadata stored within the updated image file associates the particular text item with the particular label.

16. The method of claim 1, further comprising:
within the text output, identifying a particular label that corresponds to the particular key;
determining a second location, within the image, that corresponds to the particular label;
wherein automatically determining that the particular text item is a value for the particular key is based, at least in part, on the particular location and the second location.

17. The method of claim 1, wherein:
the image is associated with a particular entity;
a row in a database table is associated with the particular entity; and
the metadata further comprises data that associates the image file with the row of the database table.

18. The method of claim 1, further comprising:
within the text output, identifying a second text item;
based at least in part on the image, automatically determining that the second text item is a value for a second key;
wherein the metadata further includes the second text item and indicates that the second text item is a value for the second key;
wherein the second key is different than the particular key.

19. One or more non-transitory computer-readable media storing instructions that, when executed by one or more computing devices, cause:
receiving an image file containing an image;
performing optical character recognition on the image to extract text output from the image;
within the text output, identifying a particular text item;
wherein the particular text item is located at a particular location of the image;
based at least in part on the image, automatically determining that the particular text item is a value for a particular key;
generating metadata (a) that includes the particular text item and (b) that indicates that the particular text item is a value for the particular key; and
creating an updated image file by inserting, within the image file, the metadata; and
based, at least in part, on the particular location, displaying the particular text item as rendered text within a display of the image.

20. A system, comprising one or more computing devices, and one or more non-transitory computer-readable media storing instructions that, when executed by the one or more computing devices, cause:
receiving an image file containing an image;
performing optical character recognition on the image to extract text output from the image;
within the text output, identifying a particular text item;
wherein the particular text item is located at a particular location of the image;
based at least in part on the image, automatically determining that the particular text item is a value for a particular key;
generating metadata (a) that includes the particular text item and (b) that indicates that the particular text item is a value for the particular key; and
creating an updated image file by inserting, within the image file, the metadata; and
based, at least in part, on the particular location, displaying the particular text item as rendered text within a display of the image.

* * * * *